United States Patent [19]

Minemura et al.

[11] Patent Number: 5,247,662
[45] Date of Patent: Sep. 21, 1993

[54] JOIN PROCESSOR FOR A RELATIONAL DATABASE, USING MULTIPLE AUXILIARY PROCESSORS

[75] Inventors: Harumi Minemura; Shunichiro Nakamura, both of Kanagawa, Japan

[73] Assignee: Mitsubishi Denki Kabushiki Kaisha, Japan

[21] Appl. No.: 576,202

[22] Filed: Aug. 29, 1990

[30] Foreign Application Priority Data

Aug. 31, 1989 [JP] Japan .............. 1-225815
Jun. 8, 1990 [JP] Japan .............. 2-151114

[51] Int. Cl.⁵ .............................................. G06F 7/24
[52] U.S. Cl. ................................. 395/600; 364/283.4;
364/282.4; 364/282.1; 364/259.2; 364/259.1;
364/259; 364/230.3; 364/230; 364/DIG. 2
[58] Field of Search ............. 395/600; 364/282.4,
364/281.7, 942.4

[56] References Cited

U.S. PATENT DOCUMENTS

| | | | |
|---|---|---|---|
| 4,769,772 | 9/1988 | Dwyer | 395/600 |
| 4,901,229 | 2/1990 | Tashiro et al. | 395/650 |
| 4,925,311 | 5/1990 | Neches et al. | 395/650 |
| 4,967,341 | 10/1990 | Yamamoto et al. | 395/600 |
| 5,006,978 | 4/1991 | Neches | 395/650 |
| 5,121,494 | 6/1992 | Dias et al. | 395/600 |
| 5,166,674 | 11/1992 | Baum et al. | 340/825.07 |
| 5,179,699 | 1/1993 | Iyer et al. | 395/650 |
| 5,191,578 | 3/1993 | Lee | 370/63 |

*Primary Examiner*—Thomas C. Lee
*Assistant Examiner*—Marie N. Von Buhr
*Attorney, Agent, or Firm*—Wolf, Greenfield & Sacks

[57] ABSTRACT

A join processor for relational databases, which includes a main processor (1) for processing information; a main memory (2) connected to the main processor to store information; a plurality of auxiliary processors (3) controlled by the main processor; a plurality of auxiliary memories (4) each connected to the corresponding auxiliary processor; and a device for enabling said auxiliary processors to perform in parallel dividing and storing relations of relational databases in the auxiliary memories in units of record and extracting from the auxiliary memories and sorting join fields of the relations to be joined.

5 Claims, 9 Drawing Sheets

FIG. 4
OPERATION OF AUXILIARY PROCESSOR

FROM FIG.5A

EMPLOYEE (5)

| | EMPLOYEE NAME | TITLE No. | ... |
|---|---|---|---|
| 1001 | TANAKA AKIRA | 2 | |
| 1002 | YAMADA TAKASHI | 4 | |
| 1003 | SATO JUNICHI | 2 | |
| 1004 | TANAKA HIDETOSHI | 3 | |
| 1005 | TANAKA HIDEHIKO | 1 | |
| 1006 | TAKAHASHI YOSHIHIKO | 4 | |
| 1007 | SAITO MASAKI | 3 | |
| 1008 | TANAKA KOICHI | 2 | |

(7, 11)

TITLE (6)

| | TITLE No. | TITLE | ... |
|---|---|---|---|
| 2001 | 3 | CLERK | |
| 2002 | 1 | PLANNING | |
| 2003 | 4 | ACCOUNTING | |
| 2004 | 2 | SALES | |

(8, 12)

25

JOIN PROCESSOR FOR A RELATIONAL DATABASE, USING MULTIPLE AUXILIARY PROCESSORS

BACKGROUND OF THE INVENTION

The present invention relates to join processors for joining relations based on join fields of relational databases.

Figure 5A:
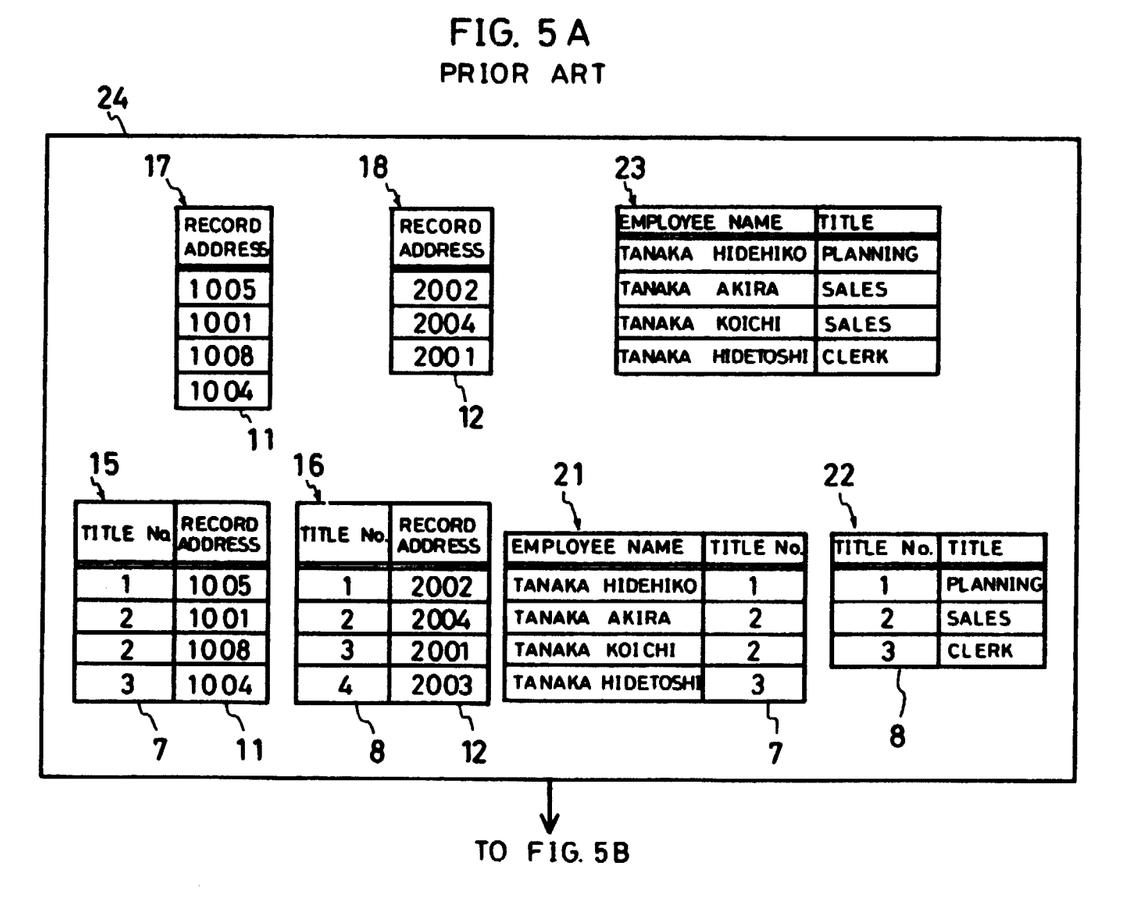
FIGS. 5A and 5B show a block diagram of a conventional join processor for relational databases.
Figure 5B:
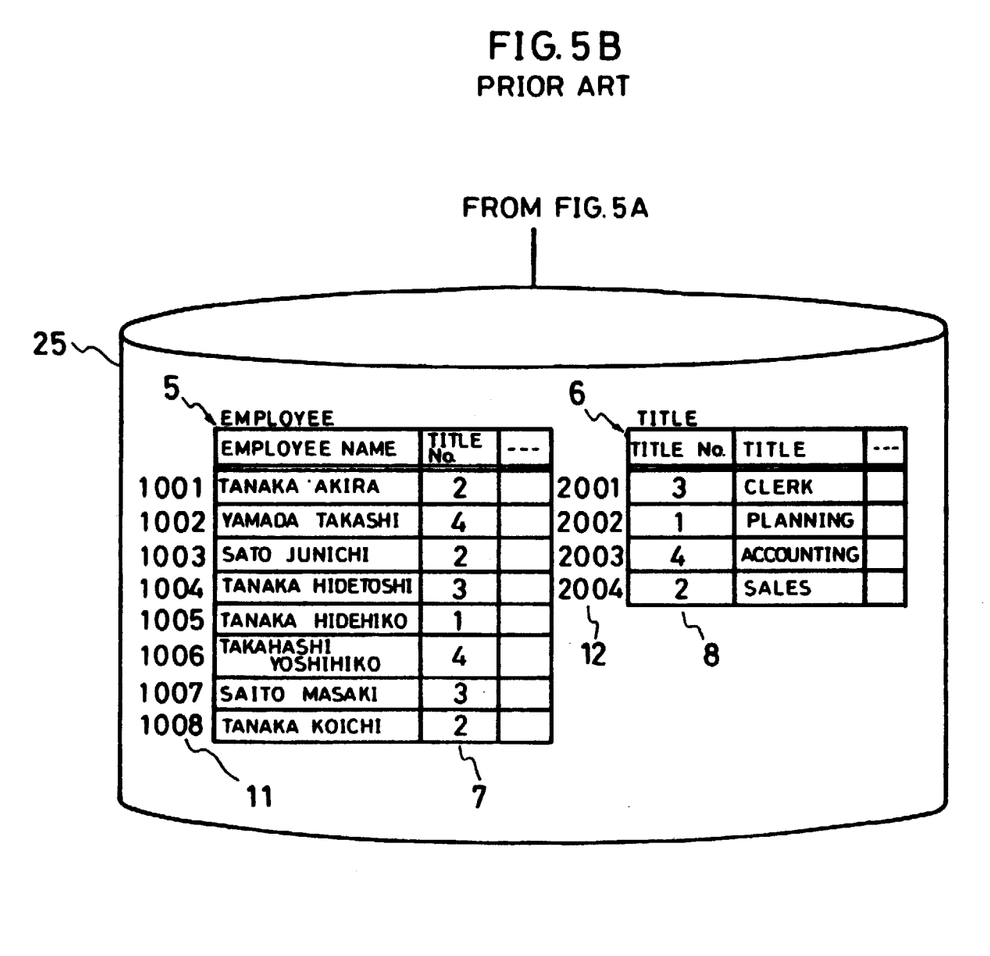

A conventional join processor for relational data bases such as shown in J. D. Ullman, "Principles of Database Systems," Computer Science Press Inc., Sec. 8.1 (p. 328, line 5 to p. 331, line 6 in the Japanese version translated by Kunii, T. and Ookubo, N. and published by Nippon Computer Institute) is shown in FIGS. 5A and 5B. The join processor includes a computer 24 and a disk unit 25 which is connected to the computer 24. A pair of relations 5 and 6 are stored in the disk unit 25. Each record of the relation 5 or 6 has a join field 7 or 8 and an address 11 or 12. In the computer 24 there are a pair of address tables 15 and 16, each of which consists of the join field 7 or 8 and the record address 11 or 12 which are extracted from the relations 5 and 6 and sorted according to the values of the join fields 7 and 8 (or arranged in the order of increasing numbers). An address table 17 or 18 has only the addresses 11 or 12 of the records which meet the join (correspondence) conditions determined by comparison between the join fields 7 and 8 in the address tables 15 and 16. A record set 21 or 22 has records which are extracted from the relation 5 or 6 so as to meet the join conditions. A record set 23 contains the results of a join process.

In such a relational database, all data are managed in the form of a table which is called a "relation." Each relation is composed of a plurality of fields in which attribute information is described. The join process is a process by which a set of records having the equal join field values in a plurality of relations is determined, and the necessary fields are extracted from the set to provide attribute information over the relations.

Figure 6:
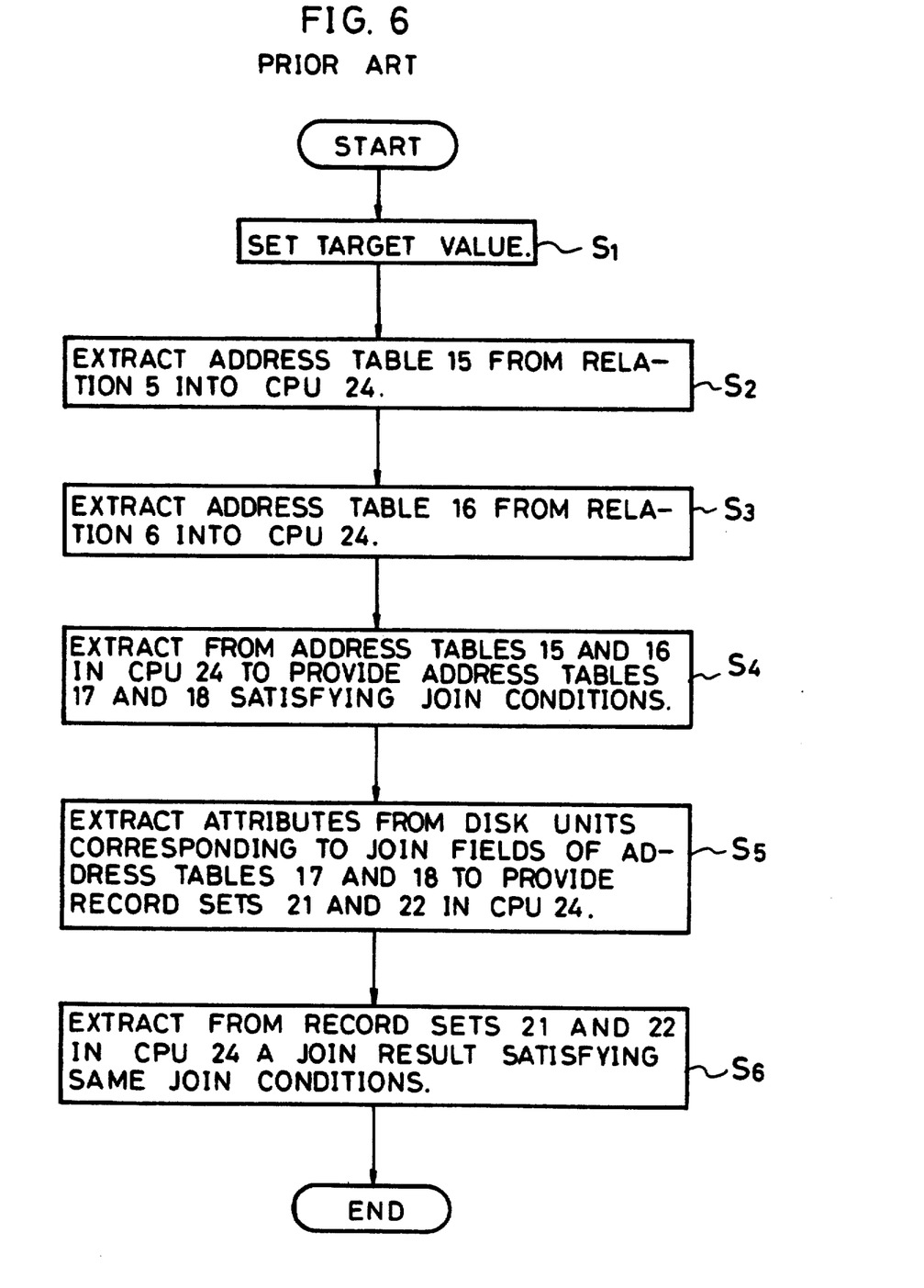
FIG. 6 is a flow chart useful for explaining the operation of the conventional join processor of FIGS. 5A and 5B.

For example, how to join two relations will be described with reference to FIG. 6. The "employee" relation 5 has an "employee name" field and a "title number" field. The "title" relation 6 has a "title number" field and a "title" field. When the full name and the title of an employee having a family name "Tanaka" are extracted from these two relations 5 and 6, it is necessary to join the relations 5 and 6 according to the join fields 7 and 8 or "title number."

First, a target value of "employee's name" or "Tanaka" is inputted to the computer 24 (Step $S_1$). Then, the computer 24 extracts from the relation 5 in the disk unit 25 the values of the join field 7 and the addresses 11 of records having a character string "Tanaka" in the employee name field (or 1001, 1004, 1005, and 1008) and sorts them in the order of increasing values of the join field 7 to provide an address table 15 (Step $S_2$). Similarly, the computer 24 extracts from the relation 6 in the disk unit 25 the values of the join field 8 and the record addresses 12 and sorts them in the order of increasing values of the join field 8 to provide an address table 16 (Step $S_3$).

Then, the join fields 7 and 8 of the address tables 15 and 16 are compared to extract the record addresses 11 and 12 of records which meet the join conditions or have equal join field values in the address tables 15 and 16 (1005, 1001, 1008, and 1004 of the address table 15 and 2002, 2004, and 2001 of the address table 16), thus producing address tables 17 and 18 (Step $S_4$).

Then, the necessary fields of records having the records addresses in the address tables 17 and 18; namely, the employee name field of the relation 5 and the title field of the relation 6, are read from the relations 5 and 6 to provide two sets of records 21 and 22 which meet the join conditions (Step $S_5$). Finally, comparing the join fields 7 and 8 of the record sets 21 and 22 provides the final join results 23 (Step $S_6$).

In such a join processor where at only a single processor performs the above process, the number of process steps increases with the size of relations to be joined Consequently, it has been difficult to provide a fast join processor for a large size of relations.

SUMMARY OF THE INVENTION

Accordingly, it is an object of the invention to provide a fast join processor for a large size of relations to be joined.

According to the invention there is provided a join processor for relational databases, which includes a main processor for processing information; a main memory connected to the main processor to store information; a plurality of auxiliary processors controlled by the main processor; a plurality of auxiliary memories each connected to the auxiliary processor; and a unit for dividing and storing relations of relational databases in the auxiliary memories in units of record so that join fields of the relations to be joined are extracted from said auxiliary memories and sorted in the auxiliary processors in parallel.

Other objects, features, and advantages of the invention will be apparent from the following description when taken in conjunction with the accompanying drawings.

DESCRIPTION OF THE PREFERRED EMBODIMENT

In FIGS. 1A, 1B, 2A and 2B, join processor consists of a main processor 1; a main disk unit 2 connected to the main processor 1; four auxiliary processors $3a$-$3d$ controlled by the main processor 1; and four auxiliary disk units $4a$-$4d$ each connected to the corresponding auxiliary unit $3a$-$3d$. Relations $5a$-$5d$ and $6a$-$6d$ are divided and stored in the auxiliary disk units $4a$-$4d$, respectively.

Figure 1A:
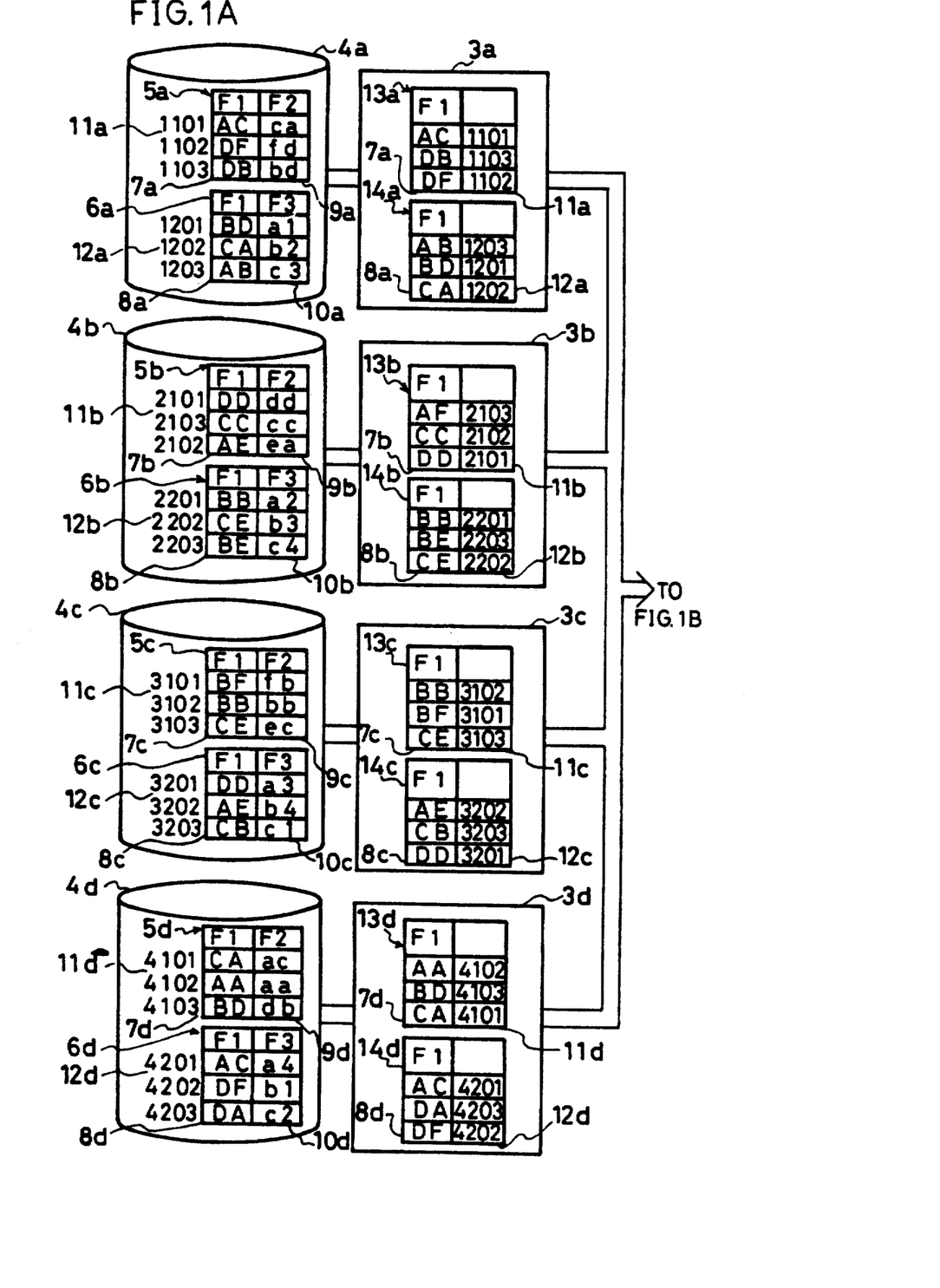
FIGS. 1A, 1B, 2A and 2B are block diagrams of join processors for relational databases according to embodiments of the invention.
Figure 1B:
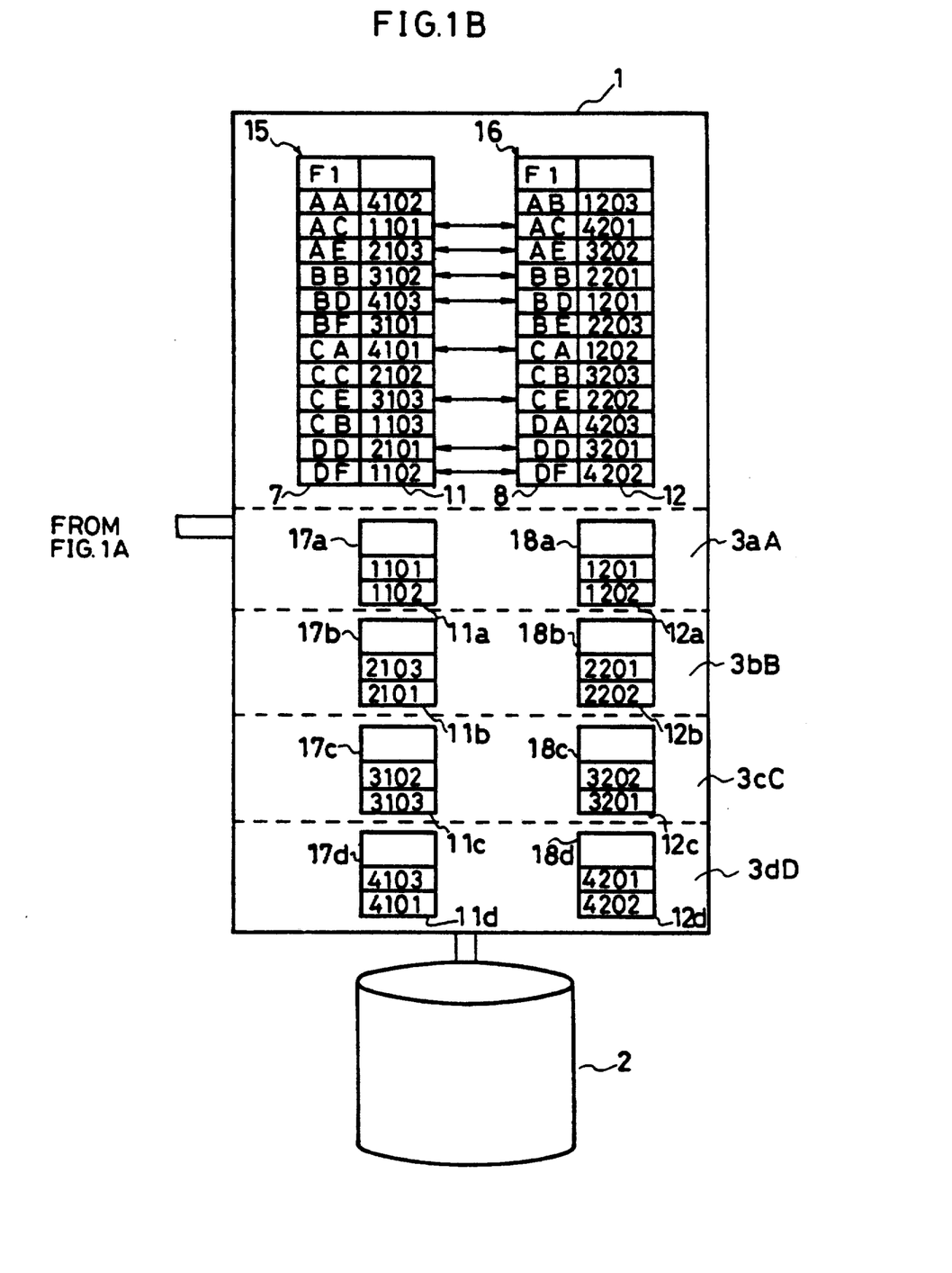
Figure 2A:
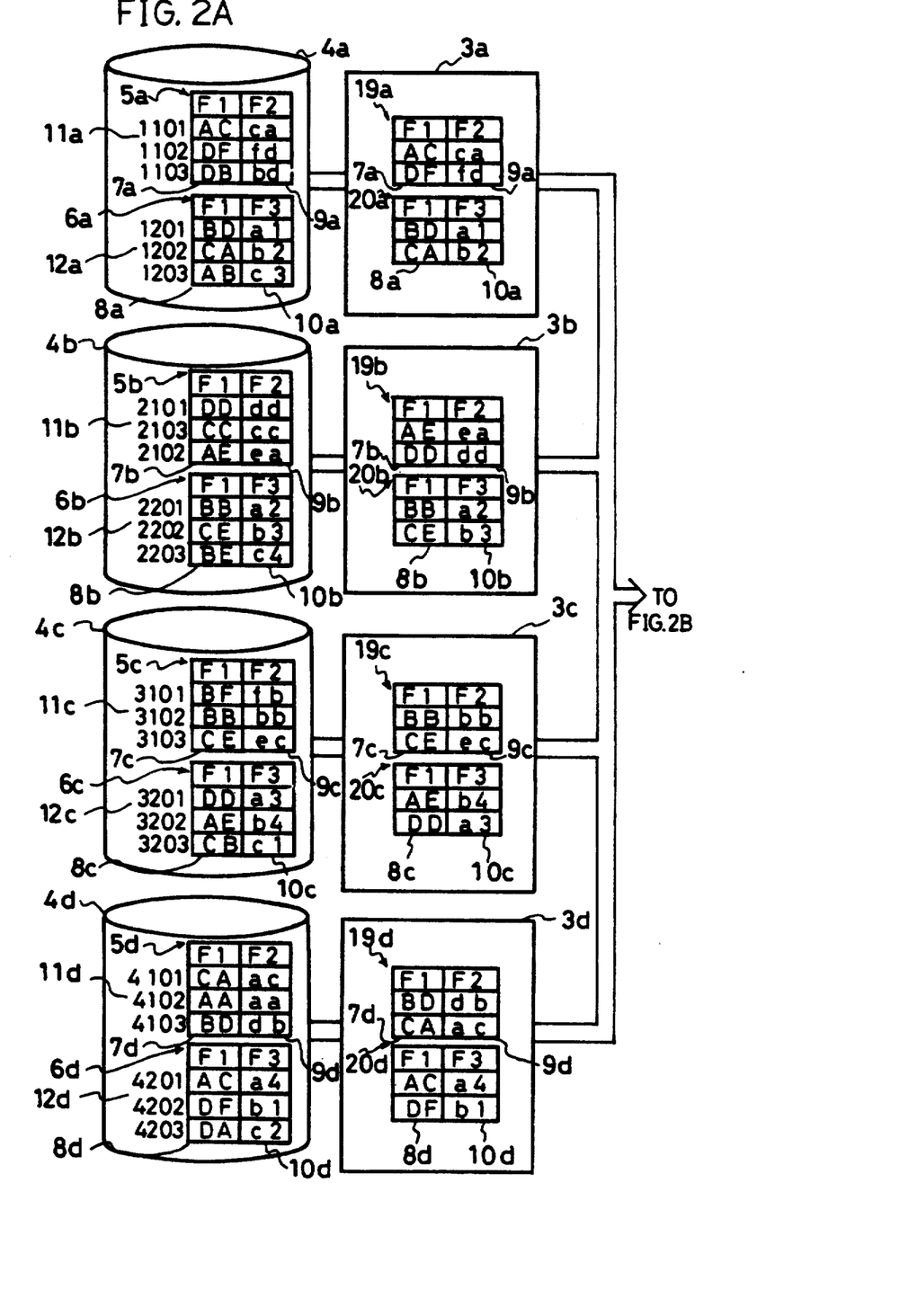
Figure 2B:
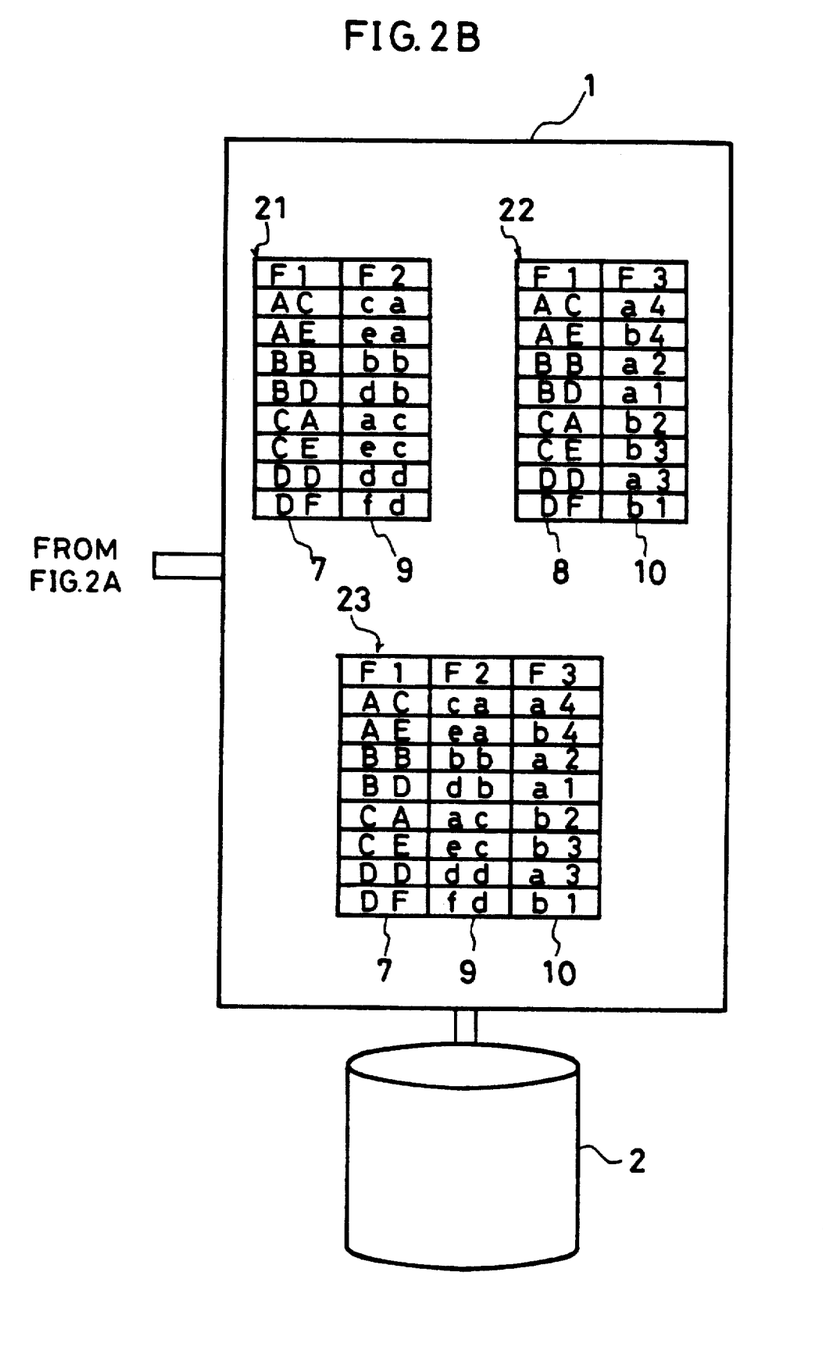

In FIGS. 1A and 1B, reference numerals $7a$-$7d$ and $8a$-$8d$ designate join fields F1 of the relations $5a$-$5d$ and $6a$-$6d$. $9a$-$9d$ are the other fields F2 of the relations $5a$-$5d$. $10a$-$10d$ are the other fields F3 of the relations $6a$-$6d$. and $12a$-$12d$ are record addresses of the relations $5a$-$5d$ and $6a$-$6d$, respectively, $13a$-$13d$ and $14a$-$14d$ are address tables which consist of the join fields (F1) 7a-7d and 8a-8d and the record addresses 11a-11d and 12a-12d which are sorted in the order of increasing values of the join fields (F1) 7a-7d and 8a-8d. The "order of increasing values" herein used means the order of natural numbers 1, 2, 3, ... or the order of alphabets a, b, c, .... 15 and 16 are address tables in which the address tables 13a-13d and 14a-14d transferred from the auxiliary processors 3a-3d to the main processor 1 are merged and sorted by the main processor 1 in the order of increasing values of the join fields (F1) 7 and 17a-17d and 18a-18d are address tables made for each of the auxiliary processors 3a-3d by comparing the join fields (F1) 7 and 8 in the address tables 15 and 16 to determine the record addresses which meet the join conditions.

In FIGS. 2A and 2B, 19a-19d and 20a-20d are sets of records which meet the join conditions read by the auxiliary processors 3a-3d from the relations 5a-5d and 6a-6d in the auxiliary disk units 4a-4d. 21 and 22 are sets of the records 19a-19d and 20a-20d obtained in the auxiliary processors 3a-3d and transferred to the main processor 1. 23 is a set of records obtained from the join process.

The join process is characterized in that the relations of a relational database are divided and stored in the respective auxiliary disk units 4a-4d and that the join fields are extracted from the auxiliary disk units 4a-4d and sorted or arranged in the order of increasing values in the respective auxiliary processors 3a-3d in parallel. That is, each auxiliary processor 3a-3d reads the join field from the auxiliary disk unit 4a-4d to form an address table which consists of the join fields and the record addresses containing the number of the auxiliary processor 3a-3d. The address table is sorted in the order of increasing values of the join field and transferred to the main processor 1. The main processor 1 selects the record addresses which meet the join conditions and transfers them back to the auxiliary processors 3a-3d. The auxiliary processor 3a-3d reads the necessary fields from the auxiliary disk unit 4a-4d and transfers to the main processor a set of records which consist of join fields and other necessary attribute fields. The main processor 1 performs a join process according to the records transferred by the respective auxiliary disk units 4a-4d.

The operations of how the relation 5 consisting of the field (F1) 7 and the field (F2) 9 and the relation 6 consisting of the field (F1) 8 and the field (F3) 10 are joined according to the fields (F1) 7 and 8 and how the fields (F1) 7, (F2) 9, and (F3) 10 are extracted will be described with reference to FIGS. 3 and 4.

Figure 3:
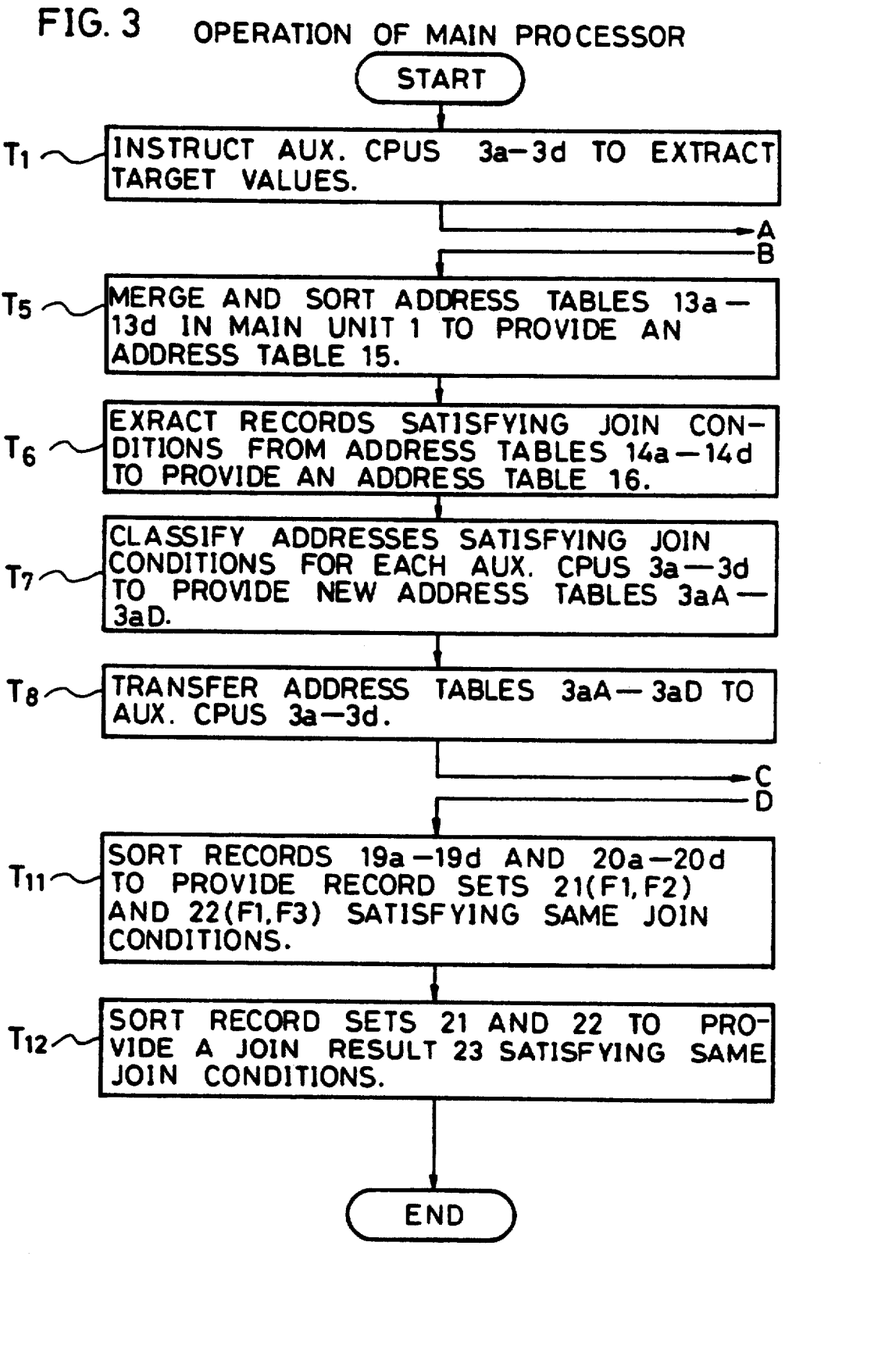
FIG. 3 is a flow chart useful for explaining the operation of the main processor of FIGS. 1A, 1B, 2A and 2B.

First of all, the main processor 1 instructs the respective auxiliary processors 3a-3d to extract the target values F1, F2, and F3 (Step $T_1$ in FIG. 3). In FIG. 4, each auxiliary processor 3a-3d extracts from the auxiliary disk unit 4a-4d the join fields (F1) 7a-7d and the record addresses 11a-11d and sorts them in the order of increasing value of the join field (F1) 7a-7d to provide an address table 13a-13d (Step $T_2$). Similarly, the join fields (F1) 8a-8d and the record addresses 12a-12d of each relation 6a-6d are extracted and sorted in the order of increasing values of the join field (F1) 8a-8d to provide an address table 14a-14d (Step $T_3$). The respective auxiliary processors 3a-3d transfer the resulting address tables 13a-13d and 14a-14d to the main processor 1 (Step $T_4$). These processes are carried out in parallel in the respective auxiliary processors 3a-3d.

In FIG. 3, the main processor 1 merges and sorts the address tables 13a-13d transferred from the auxiliary processors 3a-3d according to the join fields (F1) 7a-7d to provide an address table 15 with respect to the relation 5 (Step $T_5$). Similarly, the address tables 14a-14d are merged and sorted according to the join fields (F1) 8a-8d to provide an address table 16 with respect to the relation 6 (Step $T_6$).

The join fields (F1) 7 and 8 of the address tables 15 and 16 are compared to determine a set of records which meet the join conditions or have the equal join field values as shown by arrows in FIG. 1B. The main processor 1 then classifies the addresses of the records satisfying the join conditions based on the number of an auxiliary processor 3a-3d which is contained in the record address to form new address tables 3aA-3dD for the respective auxiliary processors 3a-3d (Step $T_7$) and transfers them to the respective auxiliary processors 3a-3d (Step $T_8$).

In the embodiment of FIGS. 1A and 1B, the highest digit of the record addresses 17a-17d and 18a-18d in the address tables 3aA-adD represents the number of an auxiliary processor where the record is stored. That is, the numbers 1-4 in the highest digit of a record address correspond to the respective auxiliary processors 3a-3d.

Figure 4:
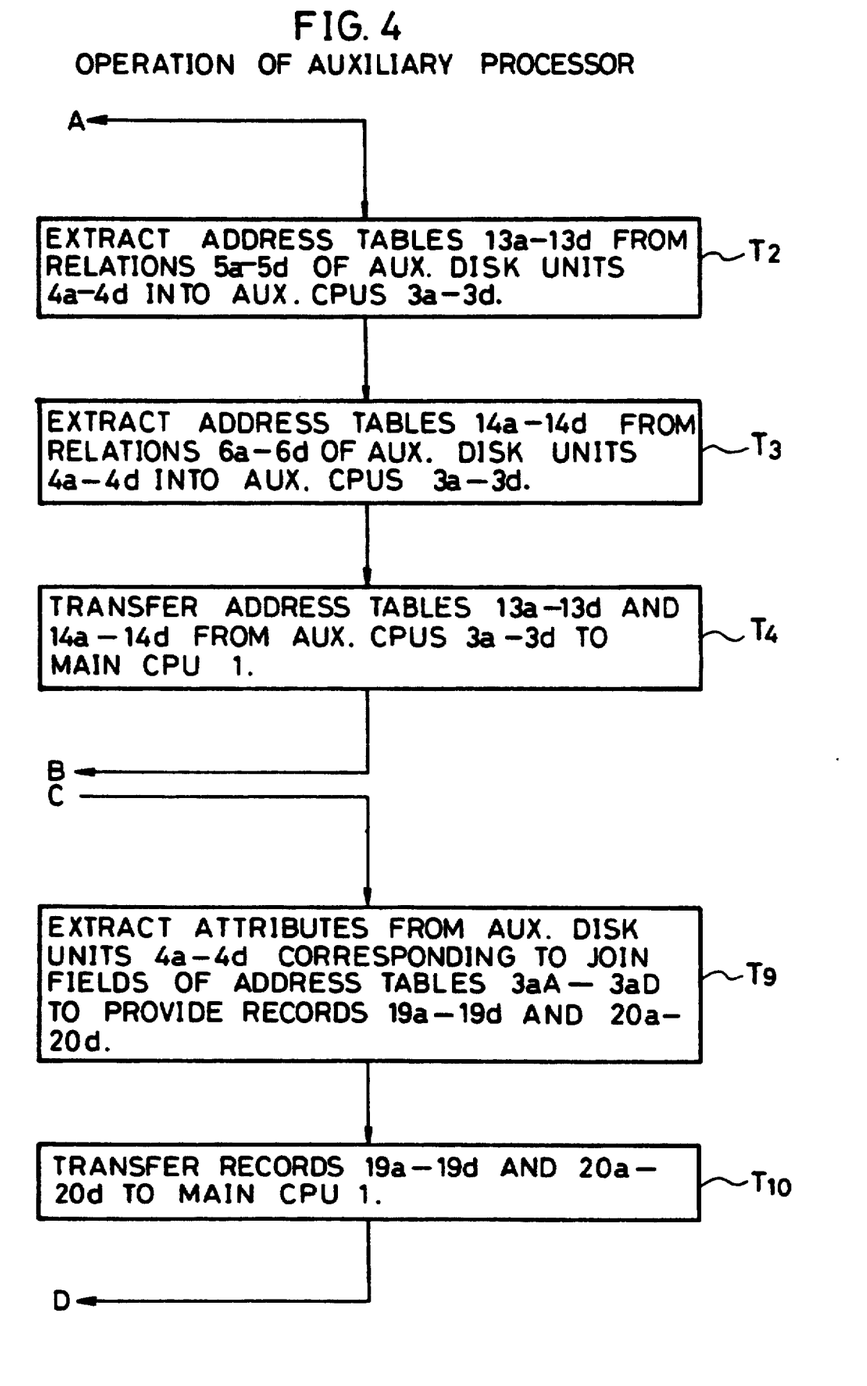
FIG. 4 is a flow chart useful for explaining the operation of each of the auxiliary processors of FIGS. 1A, 1B, 2A and 2B.

In FIG. 4, the respective auxiliary processors 3a-3d read the join fields (F1) 7a-7d of records at the record addresses 11a-11d in the address tables 17a-17d and the other necessary attribute fields (F2) 9a-9d from the relations 5a-5d in the auxiliary disk units 4a-4d to determine sets of records 19a-19d which meet the join conditions (Step $T_9$), and transfer them to the main processor 1 (Step $T_{10}$). Similarly, the join fields (F1) 8a-8d of records at the record addresses 12a-12d in the address tables 18a-18d and the other necessary attribute fields (F3) 10a-10d are read from the relations 6a-6d in the respective auxiliary disk units 4a-4d to determine record sets 20a-20d which meet the join conditions (Step $T_9$) and transfer them to the main processor 1 (Step $T_{10}$). These processes are carried out in parallel in the respective auxiliary processors 3a-3d for each assigned relation.

In FIG. 3, the main processor 1 compares the join fields (F1) 7a-7d of the record sets 19a-19d transferred from the auxiliary processors 3a-3d to sort those which meet the join conditions in the order of increasing values to provide a record set 21 (Step $T_{11}$). Similarly, the join fields (F1) 8a-8d and (F3) 10a-10d of the record sets 20a-20d are compared to sort those which meet the join conditions in the order of increasing values to provide a record set 22 (Step $T_{11}$). Then, the join fields (F1) 7 and 8 of the record sets 21 and 22 are compared to provide the join results or a record set 23 (Step $T_{12}$).

Alternatively, the number of auxiliary processors, which is four in the above embodiment, may be two or more. The number of disk units connected to the main or auxiliary processor may be two or more. Where the join fields are indexed, the index consisting of the join fields and record addresses sorted according to the join fields is stored in the main disk unit 2 connected to the main processor 1. That is, the address tables 15 and 16 in FIG. 1 are identical with the index described by J. D. Ullman, "Principles of Database Systems," Sec. 2.5 (p. 79, line 3 through p. 81, line 7 in Japanese Translation), which are stored in the main disk unit 2. Since the main processor 1 compares the values of join fields in the index to extract the records which meet the join conditions, it is possible to join the relations by repeating the above process.

For example, where the join fields 7, and 8 of the relations 5 and 6 are indexed in FIG. 1A and 1B, the indexes are sorted according to the join fields 7 and 8 in the same manner as in the address tables 15 and 16 of FIG. 1 so that the join fields 7 and 8 are compared. By repeating the above process, it is possible to join the relations 5 and 6. In this case there is no need to make the address tables 15 and 16, thus providing a faster join process than that of the above embodiment.

In ordinary parallel computers, the computer resources, such as CPU, memory, and disks, are allocated so as to perform parallel operations efficiently, thereby providing high speed processing. With such simple parallel processes, however, it is difficult to provide high speed processing for providing the desired conclusion. In the join processor according to the invention, on the other hand, the main processor assigns several operations to the respective auxiliary processors for performing together a join operation on a relational database, thereby providing high speed processing.

The results of a test conducted by the inventors will be described. The measurements of 10,000 and 1,000 joins made by high speed database machines (HDM) which have three CPUs (one main processor and two auxiliary processors) and five CPUs (one main processor, and 4 auxiliary processors) respectively, are as follows:

|  | 1-CPU IDM500 | 3-CPU HDM | 5-CPU HDM |
|---|---|---|---|
| Process Time (sec) | 114 | 7.46 | 5.45 |
| Speed Ratio | 1 | 15.28 | 20.91 |

The data about one CPU is for a single processor data base machine IDM500 of U.S. Britton Lee Corp. (now ShareBase Corp.). The CPUs of the HDM and the IDM500 are 32 bit Motorola MC-68020 and 16 bit Zilog Z-8000, respectively, but it is still evident that the invention produced significant effects.

We claim:

1. A join processor for relational databases, comprising:

a main processor for processing information;

a main memory connected to said main processor to store information;

a plurality of auxiliary processors controlled by said main processor;

a plurality of auxiliary memories each connected to one of said auxiliary processors so that each of said auxiliary processors has a corresponding auxiliary memory;

means for dividing and storing relations of relational databases in said auxiliary memories in sets of records, wherein each record includes a join field and an attribute field;

each of said auxiliary processors extracting join fields of relations to be joined from the records stored in the corresponding auxiliary memory, sorting said join fields in a predetermined order and transferring said sorted join fields to said main processor;

said main processor sorting said transferred join fields and selecting join fields which meet specified join conditions, classifying said selected join fields according to an auxiliary processor number to provide a classified join field respectively for each of said auxiliary processor, and transferring said classified join fields to the respective auxiliary processors;

each of said auxiliary processors extracting attribute fields from the records from which said classified join fields were extracted forming join records comprising said classified join fields and the corresponding extracted attribute fields, and sorting and transferring said join records to said main processor; and said main processor sorting said join records and joining the attribute information according to said specified join conditions to provide a join result.

2. The join processor of claim 1, wherein said auxiliary processors each have a plurality of auxiliary memories for storing said relations.

3. The join processor of claim 1, wherein said main processor performs a plurality of cycles of data transfer with said auxiliary processors when said join records are transferred.

4. The join processor of claim 1, wherein each of said sorting is performed in an order of increasing or decreasing numerical order.

5. The join processor of claim 1, wherein each of said steps sorting is performed in a forward or reverse alphabetical order.

* * * * *